US011176806B1

(12) United States Patent
Gouin et al.

(10) Patent No.: US 11,176,806 B1
(45) Date of Patent: Nov. 16, 2021

(54) ERRATIC SHORT-CIRCUIT DETECTION (71) Applicant: JOHNSON CONTROLS FIRE PROTECTION LP, Boca Raton, FL (US)

(72) Inventors: Alexandre Gouin, Quebec (CA); Nalin Ahangama Ralalage, Quebec (CA)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 16/706,395

(22) Filed: Dec. 6, 2019

(51) Int. Cl.
*G08B 29/04* (2006.01)
*G08B 29/06* (2006.01)
*H02H 3/24* (2006.01)
*G08B 25/04* (2006.01)

(52) U.S. Cl.
CPC ......... *G08B 29/043* (2013.01); *G08B 25/045* (2013.01); *G08B 29/06* (2013.01); *H02H 3/24* (2013.01)

(58) Field of Classification Search
CPC combination set(s) only.
See application file for complete search history.

(56) References Cited

U.S. PATENT DOCUMENTS

| | | | |
|---|---|---|---|
| 5,400,203 A | 3/1995 | Tice | |
| 6,100,757 A | 8/2000 | Kotzamanis | |
| 6,826,027 B2 | 11/2004 | Galgay | |
| 8,675,324 B2 | 3/2014 | Noguchi | |
| 9,153,968 B2 | 10/2015 | Meah et al. | |
| 2004/0057181 A1 | 3/2004 | Marino | |
| 2004/0153215 A1 | 8/2004 | Kearney et al. | |
| 2011/0291411 A1* | 12/2011 | Folken | H02P 9/006 290/7 |
| 2012/0098517 A1 | 4/2012 | Esumi et al. | |
| 2012/0293017 A1 | 11/2012 | Lidsky et al. | |
| 2013/0148245 A1* | 6/2013 | Becker | G08B 25/045 361/62 |
| 2014/0092505 A1 | 4/2014 | Norris et al. | |
| 2015/0364038 A1* | 12/2015 | Meah | G08B 29/06 398/111 |
| 2016/0072269 A1 | 3/2016 | Esschendal et al. | |
| 2016/0181787 A1* | 6/2016 | Meah | G08C 23/04 361/86 |
| 2017/0063074 A1 | 3/2017 | Yasusaka et al. | |
| 2017/0214238 A1* | 7/2017 | Klijn | H02H 3/006 |
| 2018/0152015 A1 | 5/2018 | Cheng et al. | |
| 2018/0351015 A1 | 5/2018 | Cheng et al. | |

(Continued)

OTHER PUBLICATIONS

Gouin et al., U.S. Appl. No. 16/413,274, "Abnormal Impedance Fault Isolation" filed May 15, 2019.

(Continued)

*Primary Examiner* — Travis R Hunnings
(74) *Attorney, Agent, or Firm* — Arent Fox LLP (57) ABSTRACT

A fire detection system may include isolation circuit having an isolation switch coupled with a system line of the fire detection system and configured to isolate a first side of the system line from a second side of the system line. The isolation circuit may also include a controller coupled with the isolation switch. The controller may be configured to detect repetitive, intermittent short circuit activity on the system line and control the isolation switch based on this activity.

24 Claims, 6 Drawing Sheets

(56) References Cited

U.S. PATENT DOCUMENTS

2019/0199089 A1   6/2019  Loume et al.
2020/0059082 A1   2/2020  Matsushita et al.
2020/0366079 A1  11/2020  Telefus et al.

OTHER PUBLICATIONS

Alexandre Gouin, U.S. Appl. No. 16/413,307, "Fault Isolation Locality" filed May 15, 2019.

* cited by examiner

ERRATIC SHORT-CIRCUIT DETECTION

BACKGROUND

Typically, fire detection and alarm systems require some type of isolation between different zones (e.g., different floors and/or rooms) of a building. Isolation requirements may allow detection and alarm devices in a first zone to remain enabled and provide continued functionality despite a second zone being disabled due to a short circuit in the second zone. A short circuit may be caused, for example, by wires rubbing during installation or by corrosion. Isolation of different zones may be accomplished by either separately wiring each zone or by adding isolation circuits to a system having all zones on the same wiring. While isolation circuits may provide lower installation costs (e.g., due to less wiring and labor) and may reduce an overall size of a fire detection and alarm system as compared to separately wired zones, isolation circuits may be susceptible to false positives caused by, for example, electrostatic discharge, lightning strikes, or transient signals (e.g., signals from multiple loads or communications on a line).

SUMMARY

An isolation circuit according to an embodiment of the present invention includes an isolation switch and a controller. The isolation switch may be coupled with a network system line (for example, in a fire detection system, a signaling line circuit, an initiating device circuit or a notification appliance circuit) at a first side of the system line and at a second side of the system line. The controller, upon detection of a short circuit on the system line, may receive a current level signal that is based on (or derived from) electrical current on the system line and a voltage level signal that is based on (or derived from) a voltage on the system line. Based on at least one of these signals, i.e., based on the current and/or voltage levels on the system line, the controller may determine whether the current or voltage is excessive. If either current or voltage are determined to be excessive, e.g., by comparison with a predetermined threshold, the controller may isolate the first side from the second side by opening the isolation switch if it is not already open. If, on the other hand, neither the current nor the voltage are excessive, the controller may cause the isolation switch to close or to remain closed, thus un-isolating the first side from the second side so that they are in electrical communication with each other.

The isolation circuit may further include a current monitor coupled between the system line and the controller. The current monitor may sense the electrical current on the system line and generate the current level signal based on the sensed electrical current.

To reduce power requirements, the controller may normally be in a sleep mode. The isolation circuit may further include a comparator coupled between the current monitor and the controller. This comparator may sense the current level signal from the current monitor and generate a current alert signal to the controller when the current level signal does not satisfy a current threshold, i.e., the current level signal is equal to and/or crosses a threshold. The current alert signal may cause the controller to transition from sleep mode to an awake mode.

In an embodiment, the controller may be configured to determine which of the first side and the second side of the isolation circuit is closest to the short circuit based on the current alert signal provided from the comparator.

In an embodiment, the isolation circuit may further comprise a voltage monitor, coupled between the system line and the controller, that senses the voltage level on the system line and generates the voltage level signal based on the voltage level.

The voltage monitor may include a first voltage monitor that senses a first voltage level at the first side of the system line and a second voltage monitor that senses a second voltage level at the second side of the system line. The controller may then determine whether one or more thresholds are satisfied based on one or more of the first voltage level or the second voltage level.

The isolation circuit may further include a timer that may be incorporated into the controller, and that in response to the current level signal and/or the voltage level signal, is initialized for a predetermined wait period and enabled to start the wait period.

Upon expiration of the wait period, the controller may verify whether the event conditions are still present. If not, the event is registered as a false positive. If the event persists, it is registered as an intermittent event. Accordingly, upon expiration of the wait period, the controller senses a second current level signal based on electrical current level on the system line and a second voltage level signal based on a voltage level on the system line. Based on these second current and voltage signals, the controller may determine whether thresholds are satisfied.

The network may be part of a fire detection system. The isolation circuit may be embedded in various fire detection system components such as initiating devices (e.g., smoke or other hazard detectors, pull stations), notification appliances (e.g., strobes, sirens, horns, electronic message boards), a fire panel, an annunciator, or a repeater. Alternatively, the isolation circuit may be contained in an independent isolator unit located on the network between fire detection system components.

In an embodiment, the isolator switch may be a solid-state switch, such as a transistor. In another embodiment, the isolator switch may be an electromechanical relay.

In yet another embodiment, a method of isolating, within an isolator, a first port from a second port, may include detecting a condition indicative of a short circuit on a network; adjusting a predetermined duration period based on a number of registered False Positive events; and waiting for the adjusted duration period to expire. If, after the duration period expires, the condition is no longer present, a False Positive event may be registered. On the other hand, if, after the duration period expires, the condition is still present, the first port may be isolated from the second port, wherein the first port is in electrical communication with a first portion of the network, and the second port is in electrical communication with a second portion of the network; and wherein in normal operation the first port is in electrical communication with the second port via the isolator.

In an embodiment, if after the duration period expires, the condition is still present, the controller may reset the number of registered False Positive events.

After isolating the first port from the second port, the controller may monitor the system line to determine whether the condition is present, and if the condition is not present, the controller may wait a predetermined delay. After the delay has expired, the controller may check again to confirm that the condition is still not present, and if the condition is not present, the controller may then reinstate electrical communication between the first port and the second port by closing the isolation switch. The duration of the predetermined delay may be based on a number of registered repetitive short events. Upon reinstating electrical communication between the first port and the second port, the controller may register the event as a repetitive short event.

In an embodiment, the controller may be woken up at predetermined intervals, when no anomalies have occurred since the last wakeup. In response, the controller may reduce the number of false positive registrations and repetitive shorts registrations.

To review, in an embodiment, when the controller is woken up by a short circuit, after a delay it checks if the short persists. If the short is gone, the controller increments a counter that tracks false positives. The higher the count is, the shorter the delay is made for the next time a short circuit is detected. The controller will therefore act more quickly when a large number of short circuits are detected over a relatively brief span.

On the other hand, once a short is confirmed and isolated, the controller may check the system line and fall back to normal operation (isolation switch is closed) when the short clears. However, if multiple shorts have forced the isolator to open in rapid succession (for example more than 3 shorts in a second), then when the line is back to normal, the isolator may wait a predetermined interval before reclosing. The more shorts that are detected in succession, the longer the controller waits to reclose. That is, the predetermined interval may be adjusted based on the number of registered repetitive shorts.

Both predetermined delays described above may slowly decay over time if no erratic shorts are seen. For example, if one second passes without any short, the counters holding the number of false positives and repetitive shorts may decay (for example by being decremented by some value such as 1) until they are back to default values. A certain number of erratic shorts may be required before the isolator modifies its behavior because a few retries and rapid shorts (for example, five rapid shorts) may be expected before it is considered to be something different from "normal".

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide systems, methods, and computer-readable medium for zone isolation by a fire detection system. In particular, a fire detection and alarm system may typically use either a voltage-sensing isolator which monitors voltage on a system line and isolates one or more zones of a building based on the voltage, or a current-sensing isolator which monitors current on a system line and isolates a building zone based on the current. However, these types of simple short-circuit isolators fail to accurately and quickly distinguish between different fault scenarios. In other words, these types of isolators are unable to distinguish false positives or false negatives due to changes to characteristics on a system line. For example, system lines not only carry voltage and current for detection and alert devices on the system line but may also carry communications between the devices. Accordingly, determining to isolate a zone solely based on the voltage or solely based on the current does not allow a detection and alarm system to distinguish between actual short circuits and false short circuits.

Aspects of the present disclosure may overcome the above-described limitations of simple short-circuit isolators by using multiple data sources in order to pinpoint correct and incorrect boundaries in the functioning of a detection and alarm system. In an example, an isolation circuit is described which uses a combination of current and voltage on a system line to determine an impedance of the system line and determine whether to isolate a building zone based on the impedance. An example of the isolation circuit and components of the isolation circuit used to make decisions corresponding to isolation based on merged data instead of relying on individual parameters are also disclosed herein.

U.S. patent application Ser. Nos. 16/413,274 and 16/413,307, both of which are incorporated herein in their entirety, relate to isolating short circuit faults in a fire detection system. The '274 application describes an isolation switch that isolates a fault based on the inferred impedance on the system line in response to detecting a short circuit. The '307 application describes a similar switch that further includes determining a delay time before isolating the circuit, based on the measured voltage of the system line, recognizing that an isolator closest to the short will show a lower voltage than another isolator further from the short will, thus allowing the closer isolator to isolate the circuit so that there is no need for the further isolator to do so.

Figure 1:
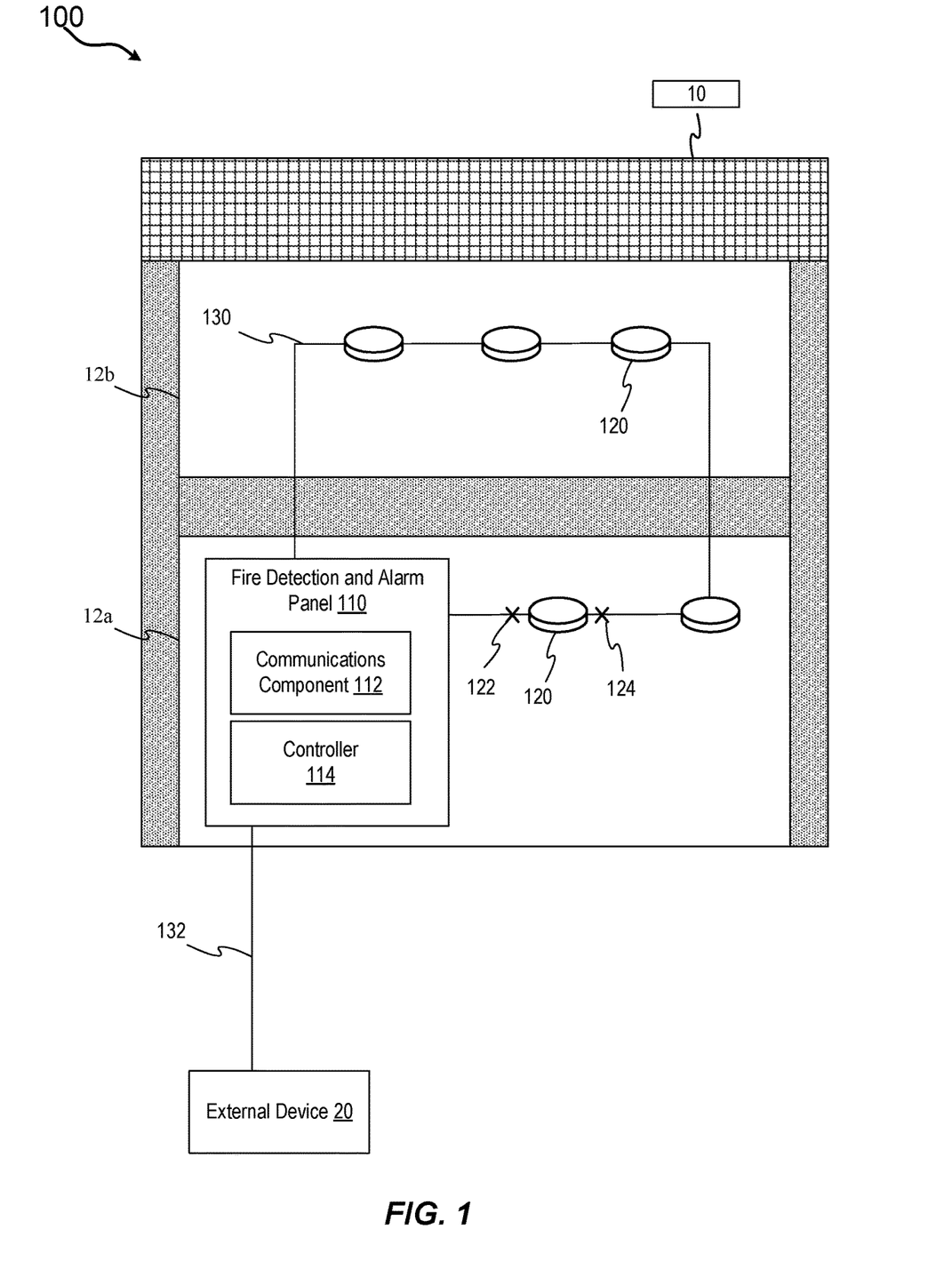
FIG. 1 is a block diagram of an exemplary fire detection system, according to aspects of the present disclosure.

Referring to FIG. 1, a fire detection and alarm system 100 for a building 10 is disclosed. The building 10 may include two or more areas (e.g., rooms or floors) on separate detection and alarm zones 12a, 12b. The detection and alarm system 100 may include a fire detection and alarm panel 110 communicatively coupled with one or more devices 120 and configured to receive information from the devices 120. Examples of the devices 120 may include but are not limited to initiating devices such as pull stations, smoke detectors, heat detectors, carbon monoxide detectors or other types of devices for detecting hazardous conditions; and notification appliances such as strobes, horns, speakers, electronic reader boards and the like, as well as separate isolator units.

The fire detection and alarm panel 110 may include a communications component 112 configured to communicate with the one or more devices 120 and/or one or more external devices 20. Examples of the external device 20 may include an emergency dispatch system (e.g., fire dispatch or police dispatch), a mobile device such as a cellular phone, a smart phone, a personal digital assistant (PDA), a smart speaker, a computer, or an Internet of Things (IoT) device, a landline phone, or any other device capable of receiving communications including text, talk, and/or data communications.

In an aspect, the communications component 112 may communicate with the one or more devices 120 via a system line 130, which may be a wired communications link. As shown by FIG. 1, the system line 130 may form a device loop (e.g., initiating devices, notification appliances, and/or panels of the detection and alarm system 100 connected together in a loop). The system line 130 may carry power and/or communications between initiating devices, notification appliances, and/or panels connected to the device loop. Accordingly, in some aspects, the system line 130 may include circuits referred to as initiating device circuits, notification appliance circuits or signaling line circuits that carry communications.

The communications component 112 may communicate with the external devices 20 via one or more communications links 132, which may be one or more of a wired communications link or a wireless communications link. In an example, the communications component 112 may include one or more antennas, processors, modems, radio frequency components, and/or circuitry for communicating via a wireline and/or wirelessly with the detection devices 120 and/or the external devices 20.

The fire detection and alarm panel 110 may also include a controller 114 configured to receive information from the one or more devices 120 and to determine whether to communicate with the external device 20. Suitable examples of the controller 114 may include, but are not limited to, a processor or plurality of processors in communication with a memory storing computer-readable instructions executable by the processor to perform the control functions described herein. For example, based on communications from one or more of the devices 120, the controller 114 may execute instructions for the communications component 112 to alert a local fire or police department, via the external device 20, about a fire or other incident.

While the fire detection and alarm panel 110 is shown in FIG. 1 as being located in a first zone 12a of the building 10, aspects of the present disclosure do not limit a location of the fire detection and alarm system 110 to this location. For example, the fire detection and alarm panel 110 may be located within any zone (e.g., 12a or 12b) of the building 10 or external to the building 10.

As shown by FIG. 1, each of the zones 12a, 12b may include one or more devices 120, some or all of which may be configured to detect a short circuit and determine whether to isolate a zone corresponding to the short circuit based on the detection. A device 120 may connect to a first connection point 122 and a second connection point 124 of the system line 130. The first connection point 122 and the second connection point 124 may be locations where wiring of the device 120 physically connects to wiring of the system line 130.

It should be understood that the isolation circuitry and operation described here below may be incorporated into a device 120, or may be incorporated into a standalone isolator, that itself is located between other devices 120 on the system line 130. For simplicity, the discussion below uses "device" and "isolator" to cover both a standalone isolator and a device having some other function such as hazard detection while also including isolation circuitry. For simplicity, FIG. 2 only deals with the isolation aspect and so does not portray any detection, notification or other functional circuitry not related to isolation.

Figure 2:
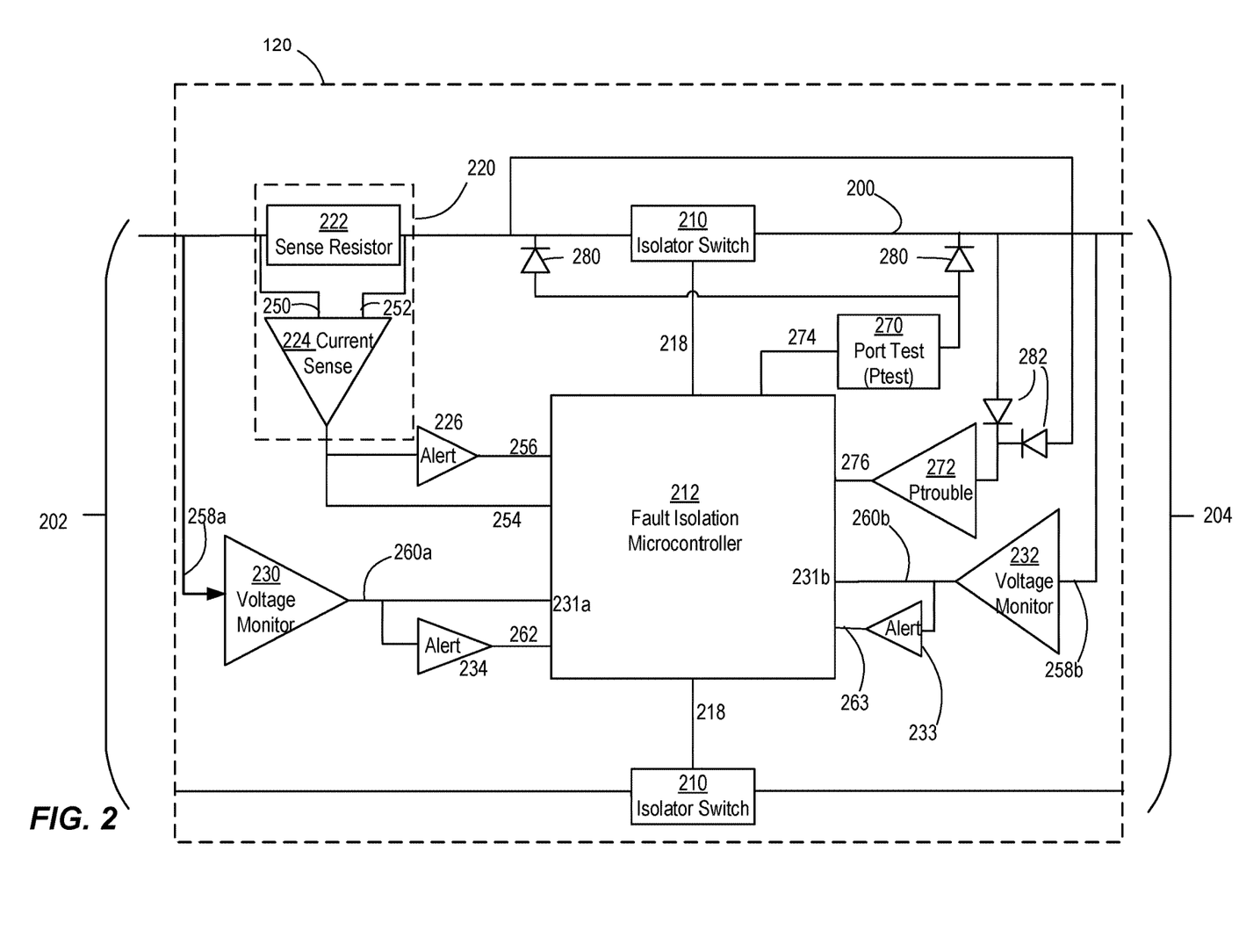
FIG. 2 is a block diagram of an exemplary fire detection system device, according to aspects of the present disclosure.

Referring to FIG. 2, a device 120 may include connection interfaces 202, 204 for connecting the device 120 to the system line 130, such as at the first connection point 122 and the second connection point 124 (refer to FIG. 1). Within the device 120, the connection interface 202 may connect to the connection interface 204 via the connection line 200. As voltage and current on the connection line 200 are the same as (or representative of) voltage and current on the system line 130, the connection line 200 may be interchanged with the system line 130 throughout the description of the device 120.

In an aspect, the device 120 may be bidirectional, meaning the first connection point 122 of the system line 130 may connect to the connection interface 202 and the second connection point 124 of the system line 130 may connect to the connection interface 204 or, alternatively, the first connection point 122 of the system line 130 may connect to the connection interface 204 and the second connection point 124 of the system line 130 may connect to the connection interface 202.

The device 120 may include one or more isolation switches 210 connected along the connection line 200. The isolation switches 210 may be configured to open based on a detection of a short circuit on the system line 130. Once opened, the isolation switches 210 electronically isolate the connection interface 202 from the connection interface 204. In an aspect, the isolation switches 210 may also be coupled with a fault isolation controller 212 via switch control line 218 and controlled (e.g., opened or closed) by the fault isolation controller 212. For example, the isolation switches 210 may receive a signal from the fault isolation controller 212 via the switch control line 218 to open or close the isolation switches 210. Examples of the isolation switches 210 include a field-effect transistor (FET) such as a metal-oxide-semiconductor (MOSFET) or junction FET (JFET), a relay such as an electro-magnetic relay, or any other type of electronic or electromechanical switch.

The controller 212 may be coupled with a current monitor 220 and voltage monitors 230, 232. The current monitor 220 may be configured to monitor current on the connection line 200 and to generate an output signal (current level signal) corresponding to the current of the connection line 200 to be sensed by to the controller 212. In an example, the current monitor 220 may include two input signal lines 250, 252 connected to the connection line 200 and an output signal line 254 connected to the controller 212. The current monitor 220 may include a current sense amplifier 224 connecting to the two input signal lines 250, 252. The current monitor 220 may also include a sense resistor 222 connected along the connection line 200 between the two input signal lines 250, 252. The current sense amplifier 224 may measure the current on the connection line 200 based on the sense resistor 222, and provide a signal (current level signal) on the output signal line 254 to the controller 212. The signal on the output signal line 254 may be a voltage representative of the detected current on the connection line 200.

In an example, when a short circuit occurs on the system line 130, the current monitor 220 may detect a change in the current along the connection line 200. The output voltage of the current monitor 220 may change based on the change in current. For example, a normal output signal on the output signal line 254 may be at a baseline voltage (e.g., 2.5 volts (V)), and when a voltage on the output signal line 254 increases (e.g., towards 5V) or decreases (e.g., towards 0V), the change in the voltage on the output signal line 254 is representative of the change in the current on the connection line 200.

For example, when a short circuit occurs on the system line 130, the current detected by the current monitor 220 may increase resulting in the output signal (e.g., a voltage level) on the output signal line 254 to increase/decrease depending on a location of the short circuit. For example, if a short circuit occurs on the side of the communication interface 202, the current on the detection line 200 may increase in the direction of the communication interface 204 towards the communication interface 202 (e.g., right to left in FIG. 2), and if a short circuit occurs on the side of the communication 204, the current on the detection line 200 may increase in the direction of the communication interface 202 towards the communication interface 204 (e.g., left to right in FIG. 2).

In an aspect, the detection device 120 may also include one or more current alert comparators 226 (for simplicity only one is shown). The current monitor 220 may be coupled with the current alert comparators 226 via the output signal line 254, as shown by FIG. 2. The current alert comparators 226 may be configured to receive the output signal of the current monitor 220, compare the output signal to one or more current thresholds, and provide a wake-up signal and an indication of which side of the detection device 120 a short circuit occurred on the system line 130 to the fault isolation controller 212 based on the comparison. In an example, the one or more current thresholds may include a reference voltage (not shown) received by the current alert comparators 226.

For example, the current alert comparator 226 may receive an output signal of the current monitor 220 via the output signal line 254 and compare the output signal of the current monitor 220 to a first current threshold (e.g., 3.566V). If the output signal of the current monitor 220 is greater than the first current threshold, the current comparator 226 may send a first current alert signal on the current alert line 256 to the controller 212. In an example, the first current alert signal from the current alert comparator 226 may trigger the controller 212 to change from a sleep mode to an awake mode. Further, since the current alert comparator 226 triggered the controller 212, the first current alert signal may also indicate to the controller 212 that a short circuit occurred on the side of the communication interface 204 based on an increase in current from the communication interface 202 to the communication interface 204 on the detection line 200.

In another example, a second current comparator (not shown) may be configured to respond to, and to indicate, that a short circuit occurred on the side of the communication interface 202 based on an increase in current from the communication interface 204 to the communication interface 202 on the detection line 200.

In another example, current alert comparator 226 may be configured to compare the absolute value of the output signal 254 against a threshold to determine if a short circuit exists on either side, and if so, wake up the fault isolation microcontroller 212.

Voltage monitors 230, 232 may be configured to monitor voltage on the system line 130 via connection line 200, and provide voltage output signals to the controller 212. In an aspect, input lines 258a, 258b of the voltage monitors 230, 232 may connect to the connection lines 200 and output lines 260a, 260b of the voltage monitors 230, 232 may connect to the controller 212. The voltage monitor 230 may monitor voltage on the system line 130 at the connection interface 202 side of the detection device 120, and the voltage monitor 232 may monitor voltage on the system line 130 at the connection interface 204 side of the device 120.

The device 120 may also include two voltage alert comparators 233, 234. As shown in FIG. 2, the voltage alert comparator 234 may compare the output signal 260a from the voltage monitor 230 with a first threshold, and the voltage comparator 233 may compare the output signal 260b from the voltage monitor 232 with a second threshold. When one of the output signals 260a, 260b matches or passes its respective predetermined threshold, the respective voltage alert comparator 234, 233 may provide a voltage alert signal (respectively 262 or 263) to the controller 212 to indicate low voltage at least one of the connection interfaces 202, 204, thus waking up the controller.

As described herein, the controller 212 may receive: the current monitor output 254; the current alert comparator output 256; the voltage monitor outputs 260a, 260b; and the voltage alert comparator outputs 262, 263. In an example, the current monitor output signal 254 and the voltage monitor output signals 260a, 260b may connect to analog to digital converter (ADC) inputs of the controller 212. For example, the voltage monitor output signal 260a may connect to an ADC input 231a, and the voltage monitor output signal 260b may connect to an ADC input 231b. The current alert comparator output signal 256 and the voltage alert comparator output signals 262, 263 may connect to alert, wake-up or interrupt inputs of the controller 212.

The controller 212 may contain instructions or logic to open (e.g., isolate communication interface 202 from communication interface 204) or close (e.g., communicatively couple communication interface 202 with communication interface 204) the isolation switches 210 based on the current monitor output signal 254, the voltage monitors output signals 260a, 260b, the current alert comparator output signal 256, and the voltage alert comparator output signal 262, 263. In an example, the instructions or logic may be stored in memory of the controller 212. The controller 212 may read the output signal 254 from the current monitor 220 and the output signals 260a, 260b from the voltage monitors 230, 232; determine whether there is an actual short circuit; and, based on the determination, control the isolation switches 210 to be opened or closed.

In other words, the controller 212 may receive an indication of the short circuit via one or more of the current monitor 220, the voltage monitors 230, 232, the current alert comparator 226, or either of the voltage alert comparators 233, 234. For example, the fault isolation controller 212 may receive an indication of the short circuit from the current alert comparators 226 via the current alert line 256 respectively, or from at least one of the voltage alert comparators 234, 233 via the voltage alert lines 262, 263. In another example, the controller 212 may receive an indication of the short circuit based on the current level signal received from the current monitor 220 via the output signal line 254, or based on the voltage level signal received from the voltage monitors 230, 232 via voltage output lines 260a, 260b.

Once an indication of a short circuit is received, the controller 212 may read the output signal 254 from the current monitor 220 and the output signals 260a, 260b from the voltage monitors 230, 232 respectively and determine whether or not an actual short circuit is on the system line 130. In some examples, the controller 212 may compare the current level signal and the voltage level signal to one or more detection thresholds (including current detection thresholds and voltage detection thresholds) to determine whether or not there is an actual short circuit. In an example, the one or more detection thresholds may represent current and/or voltage of a normal load on the system line 130. For example, one or more of the detection thresholds may be based on one or more of a typical line voltage, a permitted line length, or permitted line loading devices.

For example, the controller 212 may determine that there is a short circuit on the system line 130 based on the current level signal indicating that a current level is greater than a first current detection threshold (e.g., 0.45 Amps). In another example, the controller 212 may determine that there is a short circuit based on a detection of an abnormal impedance when the current level signal indicates that the current level is less than the first current detection threshold (e.g., 0.45 Amps) but greater than a second current detection threshold (e.g., 0.35 Amps) and a voltage level signal indicates a voltage level is less than a first voltage detection threshold (e.g., 14V) and more than a second voltage detection threshold (e.g., 8.8V).

Because the controller 212 relies on both current and voltage to determine whether a short circuit occurred on the system line 130, the device 120 is able to be more robust than devices that only monitor a single input. For example, in comparison with a typical isolator, the device 120 may more precisely recognize an actual short circuit.

The controller 212 may open or close the isolation switches 210 based on whether it has determined that there is a short circuit or not. For example, the controller 212 may send a control signal to open or close the isolation switches 210. In an aspect, the control signal may be sent via switch control line 218.

The controller 212 may contain various counters and timers for counting false positives (transients) and true (actual) positives; and for allowing certain predetermined intervals of time to pass before initiating certain actions.

To conserve power, the controller 212 may resort to a sleep mode until it receives an alert signal from either the current alert comparator 226 and/or the voltage comparator 233, 234, or receives a periodic wake-up signal.

Figure 3A:
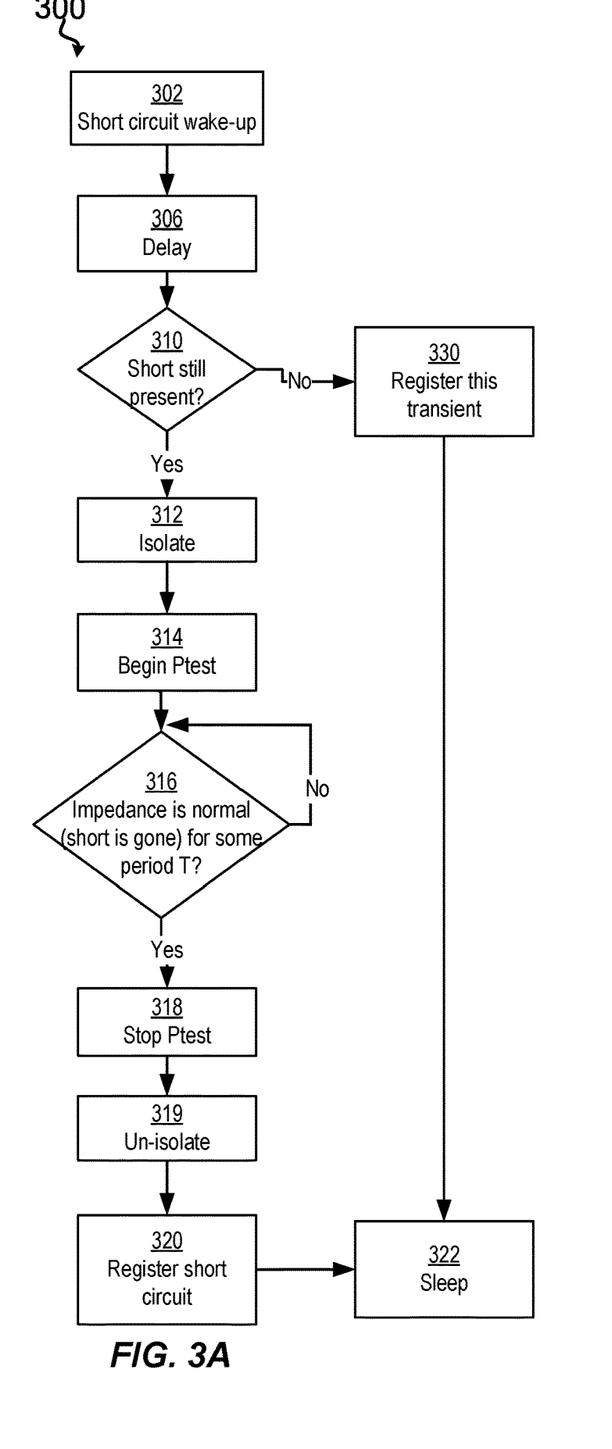
FIGS. 3A and 3B are exemplary high-level flowcharts illustrating logic operations according to aspects of the present disclosure.

FIG. 3A, provides a high-level view of exemplary operations 300 of the controller 212 when an anomaly such as a short circuit is detected and wakes up the controller. Initially, at 302, the controller 212 may receive an indication of a short circuit being detected as described above. After a delay at step 306, the controller verifies whether a short is still present (step 310). The duration of the delay in step 306 may depend upon several factors and is discussed in more detail with respect to FIGS. 4A and 4B.

If no short is detected after the delay, then the incident is considered a transient or false positive, and at step 330, the false short event is registered. Finally, at step 322, the controller goes back to sleep.

If, on the other hand, the short is still detected at step 310 after the delay, then the isolators 210 are opened (step 312) and the two ports 202 and 204 are electrically isolated from each other. The controller enables (step 314) the Ptest function 270 (FIG. 2), which continuously monitors the impedance of the line 200 by placing a predetermined voltage onto both sides of the isolator 210, and the Ptest function 270 may be coupled to the fault isolation controller 212 via a line 274. Diodes 280 serve to isolate the two sides of line 200 from each other during the Ptest. Ptrouble 272 verifies that both sides of 210 (isolated from each other by diodes 282) do not have abnormal impedances, and Ptrouble 272 may be coupled to the fault isolation controller 212 via a line 276. The controller then waits at step 316 until the impedance, as monitored by the Ptest/Ptrouble circuitry, returns to normal for some duration T, for example, 0.1 ms. The duration T may incrementally increase each time the Ptest is run, for example, by +100 µs the second time, then by +1 ms, +10 ms, +100 ms, +1 s, +10 s, +100 s, and so on.

Once the impedance returns to normal for duration T, the Ptest is stopped (step 318), the isolators 210 are closed (step 319) and the ports 202, 204 are again in electrical communication. The short circuit event is registered (step 320) and the controller 212 goes back to sleep (step 322).

Figure 3B:
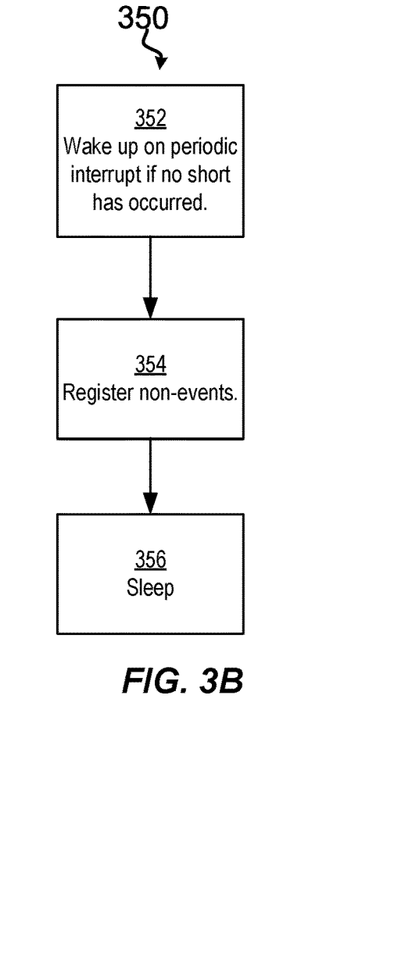

FIG. 3B illustrates an example of logic operations 350, again at a high level, for the controller 212 when no anomaly has occurred over some predetermined period, for example 10 ms. An interrupt signal may be generated periodically according to the predetermined period to wake the controller 212 (step 352). Since no anomaly (false short and true short) has caused the controller to wake over the predetermined period, the fact that no false positive and no short circuit events have occurred is "registered" (step 354) by decrementing the values of the counters that respectively track the numbers of false shorts and periodic shorts. The controller then goes back to sleep (step 356).

Note that the controller does not strictly have to sleep and then wake-up. In some embodiments, the controller may actively monitor the system line so that registration of a non-event (step 354) occurs at regular intervals in which short circuit events do not occur.

Figure 4A:
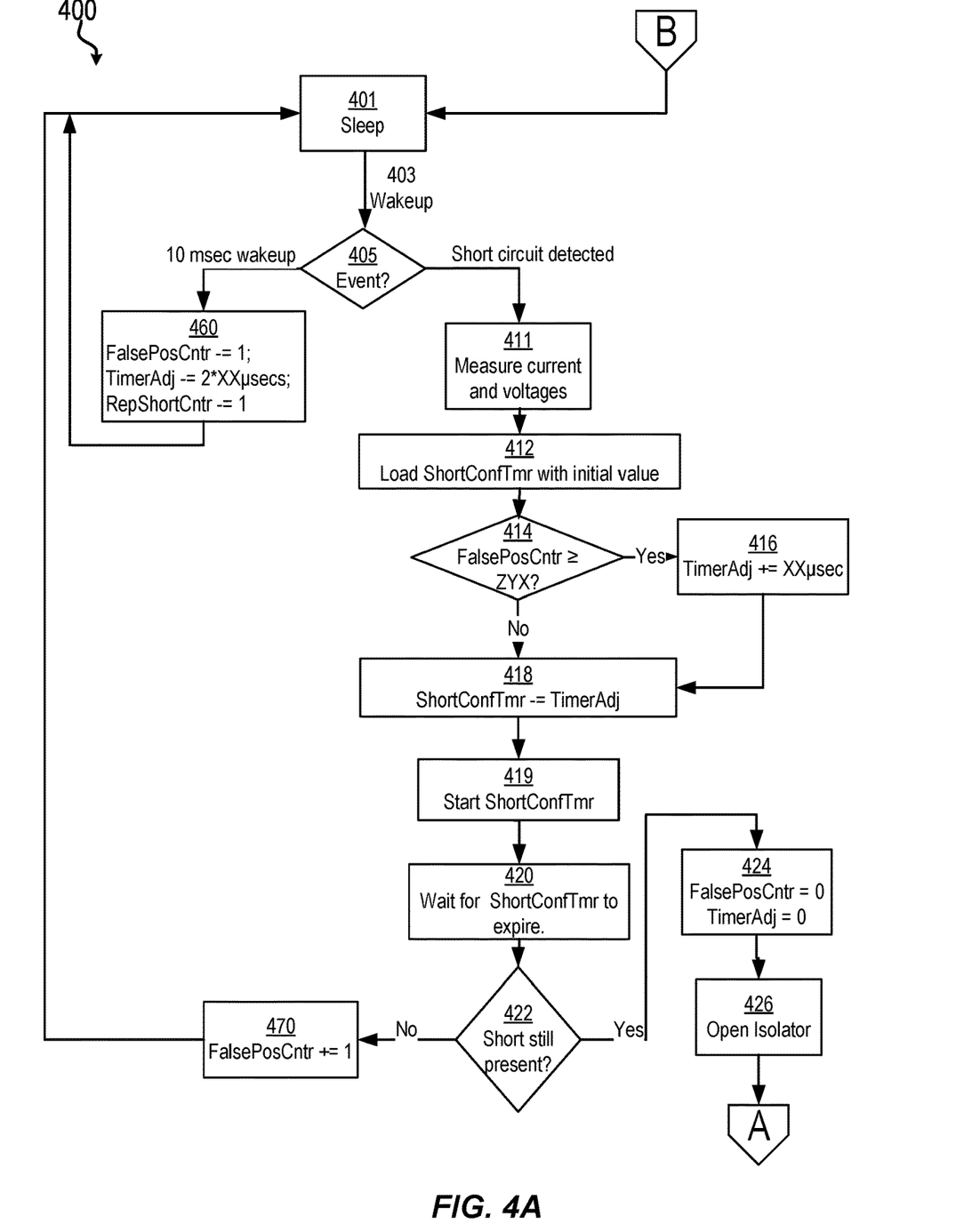
FIGS. 4A and 4B together are a flowchart describing detailed operation of an exemplary embodiment of the present invention.
Figure 4B:
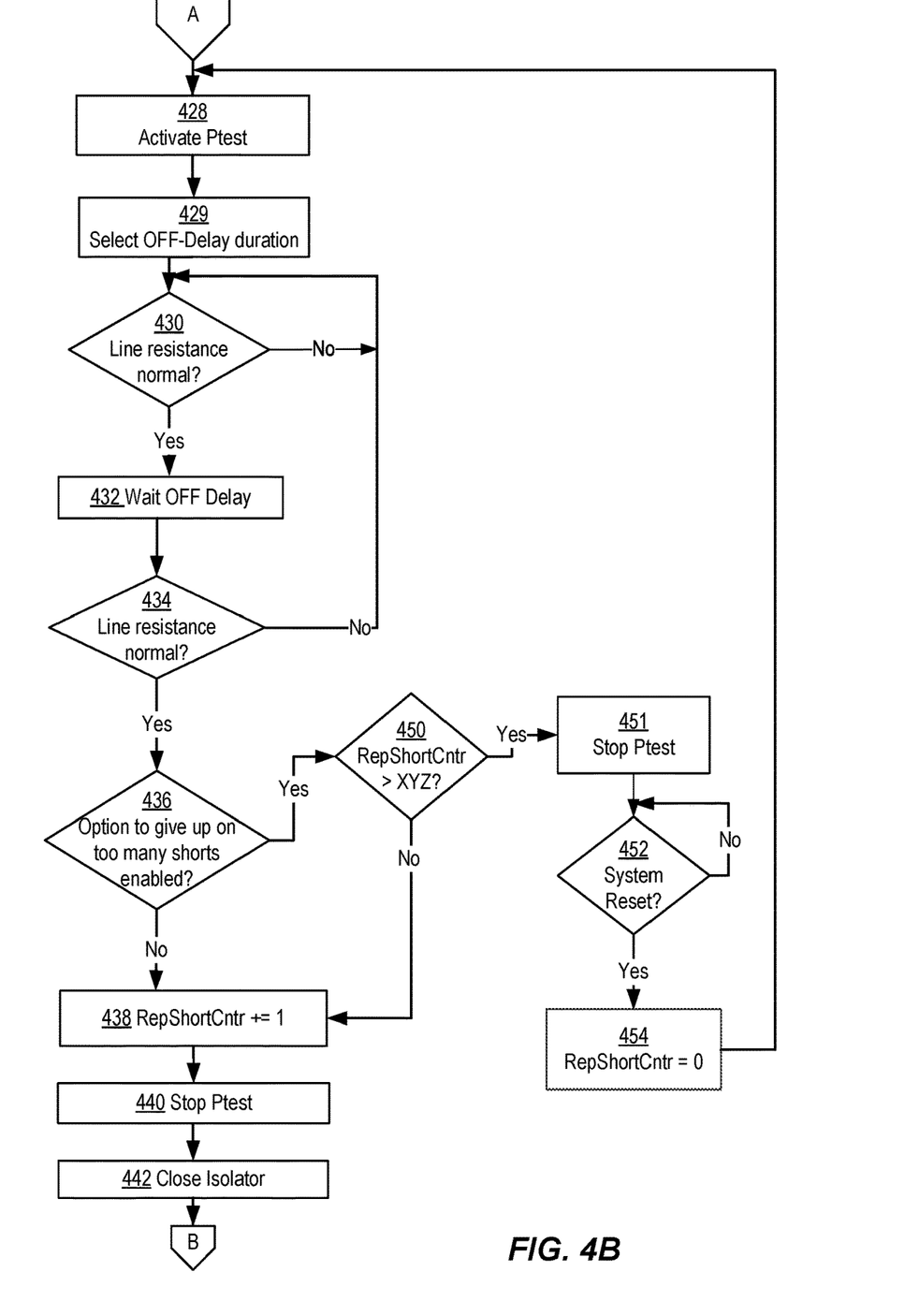

FIGS. 4A and 4B together are a flowchart 400 describing, in an exemplary embodiment, the operation of the controller in further detail.

In an aspect, most of the time the controller may typically be sleeping (step 401). The controller may wake up (step 403) upon at least two types of events that may occur, as determined at step 405.

The first type of event occurs upon detection by the isolator's detection circuitry of an anomaly in the device network, such as an abnormal change in current or voltages in the detector network that may be caused by, for example, a short-circuit on the network 130. When such an event occurs, the controller wakes up and, in step 411, measures the current and voltages on the line 200. A starting delay duration is determined based on the measured values (step 411), and loaded into a timer (ShortConfTmr) at step 412.

It may be desirable to limit the maximum delay to, for example, 6 ms. If the controller uses a 10-bit ADC, for example, to sample voltage, then the $2^{10}=1,024$ output values of the ADC may be spread evenly between 0 ms and 6 ms, so that each value step represents 6 ms/1024, or approximately 6 µs per voltage step. If the maximum voltage represented by an ADC output value of 1,023 is about 30 volts, then each 6 µs delay corresponds with a voltage drop of about 6 µs*1024/30 v≈200 µs per volt.

Meanwhile, steps 414, 416 and 418 act to shorten the duration of the delay based on the number of false positives that have already been registered. If the number of false positives registered (in FalsePosCntr) exceeds some predetermined threshold ZYX, say, for example, five false positive events, i.e., there is a history of a large number of false positives within a predetermined period, as determined in step 414, then another timer, TimerAdj is increased by XX microseconds (step 416). At step 418 the ShortConfTmr value is reduced by the value in TimerAdj (but not below zero).

In effect, if more than ZYX false positives are registered, the duration of T is reduced such that the controller will act more quickly to isolate a short circuit. That is, the controller remembers the value in TimerAdj, so that ShortConfTmr is reduced more each time step 416 is executed. For example, initially ShortConfTmr might be initialized (step 412) to 5 ms and the value of TimerAdj may be zero, so the wait at step 420 will take 5.0 ms-0 ms=5.0 ms. Later, when FalsePosCntr exceeds some threshold ZYX, TimerAdj may be incremented by 0.5 ms, so that the wait at step 420 will take 5.0 ms-0.5 ms-4.5 ms; and the next time the wait at step 420 may take only 5.0 ms-1.0 ms=4.0 ms; then 5.0 ms-1.5 ms=3.5 ms and so on until the step 420 wait time is finally small enough that the short circuit is observable at step 422.

At step 419 the controller starts the timer ShortConfTmr. Step 420 waits for ShortConfTmr to expire. The isolator then, at step 422, checks to see if the short (i.e., the anomaly condition) is still present. If the short is no longer present, then it is considered a transient short or false positive. That is, the controller woke up but the short has cleared before the predetermined time expired, i.e., at prior to ShortConfTmr reaching zero. In this case, the isolator will not isolate the interfaces 202, 204 from each other. The false positive may be registered by incrementing the FalsePosCntr counter at step 470, after which the controller returns to its sleep mode.

On the other hand, if after the Short Confirmation time delay at 420 has expired, the short is still detected at step 422, then the FalsePosCntr and the TimerAdj are reset to 0 at step 424, and the isolation switches are opened at step 426, thus isolating the two sides of the network from each other.

Operation then proceeds to FIG. 4B. While the isolator is open, the port test (Ptest) is enabled, starting at step 428. As described above with respect to steps 314 through 318, the Ptest is a hardware test that continuously checks the isolated network lines to see if they are normal, for example, by measuring impedance, or if one of the sides is still shorted. At step 429, a predetermined wait time (OFF-Delay) is selected as described with respect to Table 1 below. The controller may then sit in a loop at step 430 (i.e., the isolator remains open) until the short circuit condition goes away.

Once the line impedance returns to normal, operation proceeds to step 432, where the isolator waits out the period OFF-Delay before it again checks the line impedance at step 434. Thus even if the line impedance is normal, i.e., no short circuits are detected, the Ptest continues to operate for some period (OFF-Delay). The value of delay OFF-Delay may be based on a look-up table or equivalent governed by the value of a RepShortCntr (refer to TABLE 1 and its description below). If at step 434 the line resistance is still normal, operation proceeds to step 436; however if the line resistance is once again not normal, the steps 430, 432 and 434 may be repeated until the line resistance is stable.

When a high number of spurious/transient short events occur within a certain time frame, the risk of losing all devices on the network loop may be very high, and it may be desirable to keep the isolator open until a technician comes and verifies the system. Thus the more short circuit events that occur with a certain timeframe, the longer the controller waits (back at step 432) before closing the isolation switches and allowing normal operation. That is, the delay time OFF-Delay may be incremented each time a repetitive short is encountered, for example, by 100 μs, when the value of RepShortCntr is low, by incremental values such as 1 ms, 10 ms, 100 ms, 1 s, 10 s, 100 s, etc., as the Repetitive Count increases Note that these values are exemplary. For example, the increases in delay could be linear, or follow some other non-linear set of values.

TABLE 1

| RepShortCntr Value | OFF-Delay time |
|---|---|
| 0 | 0 μsec |
| 1 ≤ 5 | 100 μsec |
| 6 ≤ 10 | 1 msec |
| 11 ≤ 15 | 10 msec |
| 16 ≤ 20 | 100 msec |
| 21 ≤ 25 | 1 sec |
| 26 ≤ 30 | 10 sec |
| ≥31 | 100 sec |

At step 436, if the option to give up on too many shorts is not enabled, then control proceeds to step 438 where the short circuit event is registered by incrementing RepShortCntr, which affects the length of the delay time OFF-Delay as discussed above. Thus the more short circuit events that occur close to each other, OFF-Delay is increased and the more time the isolator waits before reclosing the isolator.

On the other hand, if the option is enabled but the number of confirmed short circuits has not surpassed some predetermined threshold, (as determined in step 450), then again control proceeds to step 438, where the short circuit event is registered by incrementing the RepShortCntr counter. The Ptest is stopped (step 440) and the isolator is closed at step 442, allowing once again the two sides of the network loop to communicate.

If, on the other hand, the option to give up is enabled (step 436) and the number of registered repetitive shorts (RepShortCntr) is greater than XYZ as determined at step 450 (in other words, too many short circuits have been observed in a relatively small amount of time), then at step 451 the Ptest is terminated. At step 452, the isolator sits in a loop (step 452) waiting to be reset, for example, by a technician. When the isolator is reset, RepShortCntr is reset (step 454) to zero.

Finally, the isolator goes back to sleep (step 401).

Referring back to FIG. 4A, in the absence of any short circuit detections, if the sleep mode is being utilized, step 405 may determine that the controller woke up from a periodic wake-up signal. The period may be, for example, approximately 10 milliseconds. This occurs if no anomalies have been detected since the last wakeup, and so the counters FalsePosCntr and RepShortCntr are decremented at step 460 such that in the absence of short circuit detections over time they are slowly decremented down to their default values, e.g., zero. Furthermore, the TimerAdj value may be reduced by 2*XX microseconds, double the value it is incremented by in step 416, or some other value. This is a safety measure to avoid getting stuck back and forth by increasing by X and then decreasing by X every time [<-I need to reread]

Figure 5A:
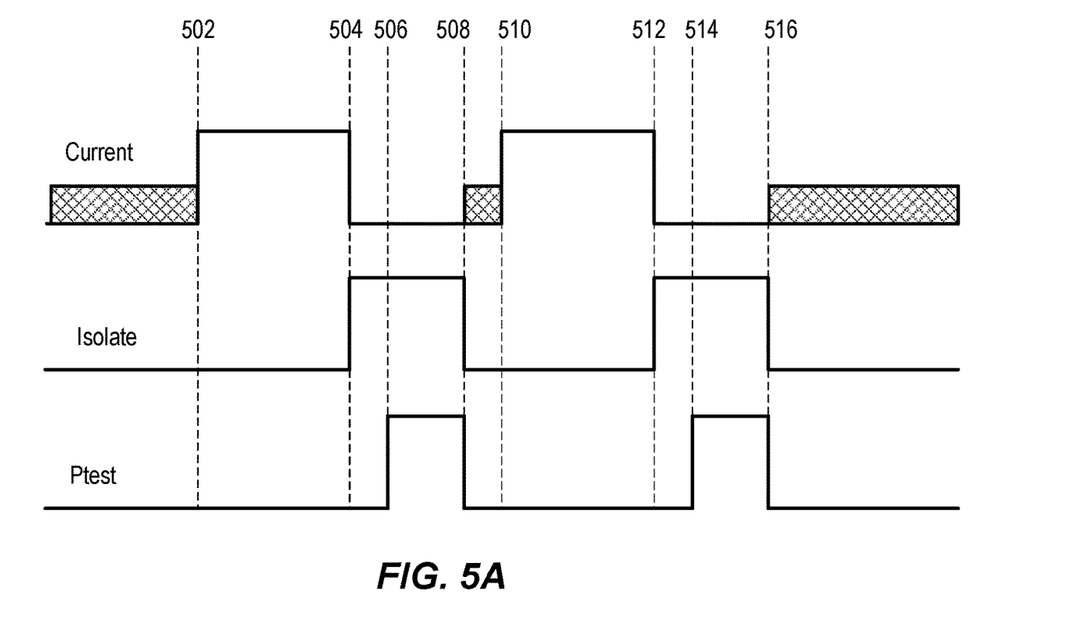
FIG. 5A is a timing diagram illustrating operation of an embodiment according to aspects of the present disclosure wherein shorts repeatedly occur and are detected by the controller.

FIG. 5A is a timing diagram (not to scale) illustrating operation of an isolator when shorts repeatedly occur and are detected by the controller, according to an embodiment. The short circuit occurs at 502, causing the current to increase. At 504, after some delay due to detection by the isolator plus an intentional wait, the isolator opens and the current drops to 0. Shortly after the isolator opens, at 506 the Ptest begins checking whether the short is still present. In this example, the Ptest at 508 detects that the short is gone; the isolator closes, the Ptest is turned off and the current rises to its normal operational value. FIG. 5A depicts a series of intermittent shorts (of which only two are shown), wherein one short may follow another by, for example, one millisecond at 510. The cycle repeats: the next short is detected at 510, the isolator opens at 512 and the Ptest is enabled at 514. At 516, the Ptest determines that the short is no longer present, the isolator closes and the current again returns to its normal operating value. If this cycle of isolate/de-isolate continues, communications along line 130 may be severely disrupted, impacting the ability of the fire detection system to function properly. An embodiment of the invention as described above identifies when this cycle is repeating by tracking the number of repeating shorts (RepShortCntr) that have occurred within a predetermined time frame and causes the isolator to remain open for a duration depending on the value of RepShortCntr.

Figure 5B:
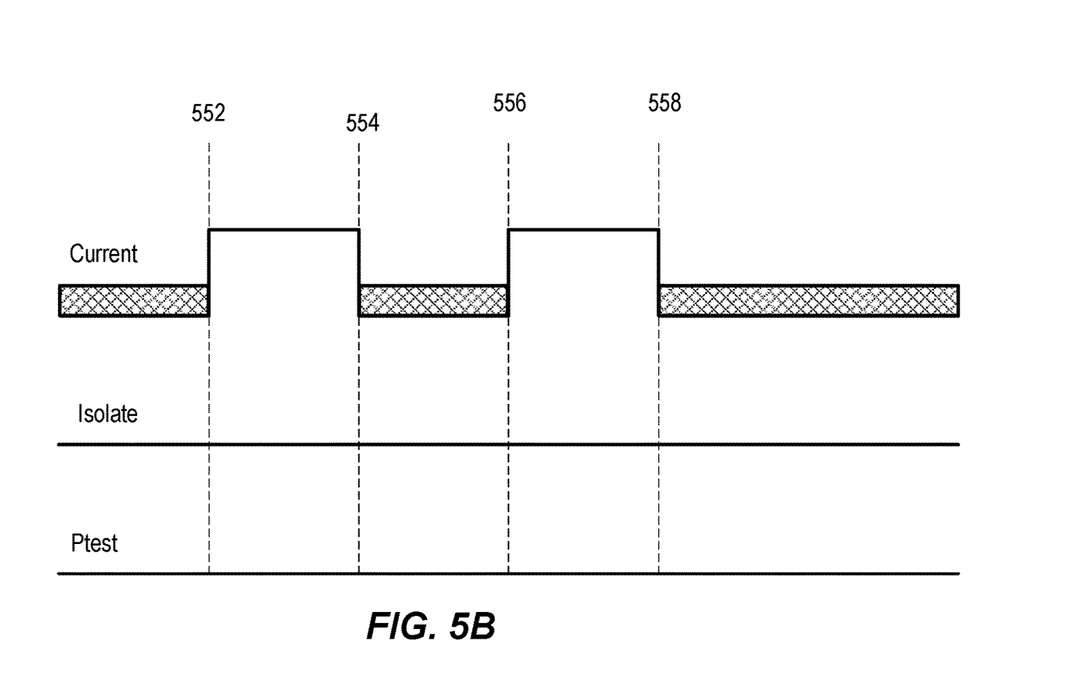
FIG. 5B is a timing diagram illustrating operation of an embodiment according to aspects of the present disclosure wherein intermittent shorts occur but disappear before the controller opens the isolator switch.

FIG. 5B is a timing diagram (not to scale) illustrating operation of an isolator when shorts repeatedly occur and then disappear so fast that they are not detected by the controller, according to an embodiment. That is, by the time the controller wakes up due to the short and attempts to verify the short, the short is gone. Thus the isolator never opens and the Ptest is never activated. Such intermittent shorts may be very quick in duration. They are generally not a problem unless they occur often, which may lead to a loss of communications. For example, at 552 there is a short and the current dramatically increases. At 554, the short goes away before the controller can verify. This corresponds to the No branch at step 422 in FIG. 4. The incident is designated as a false positive and at step 470, FalsePosCntr is incremented. In the example of FIG. 5B, another short occurs at 556 and again disappears at 558, and once again FalsePosCntr is incremented. Once the value of FalsePosCntr reaches a predetermined threshold (Yes branch at step 414), TimerAdj is incremented by XX µsecs, which results in shortening the time (ShortConfTmr) at step 418 that the controller is to wait (step 420) before again checking whether the short is still present in step 422. Eventually, the wait time ShortConfTmr may be so short that the controller will see the short and treat that event as regular short by taking the Yes branch from step 422.

Therefore, as discussed above, embodiments of the present invention have at least the goals of: 1) preventing continuous alternating between isolation on and off; and 2) tracking false positives (shorts that are so quick, the controller does not have time to isolate them) and shortening the time to detect, so that they can be isolated.

The terms "short", "short circuit" and "anomaly" have all been used to represent the same event. "short" and "short circuit" have been used often because the focus of the description has been the detection of short circuits; however use of these terms throughout this specification is not meant in any way to limit events to short circuits, except where the terms "short" and "short circuit" are used in the claims.

"Controller" as used herein may be implemented by, but is not limited to, a microprocessor, microcontroller, analog or digital circuit, an ASIC or fuzzy logic controller.

What is claimed is:

1. An isolation circuit comprising:
   an isolation switch coupled with a system line of a network and configured to isolate a first side of the system line from a second side of the system line; and
   a controller coupled with the isolation switch and configured to:
   detect a short circuit on the system line;
   upon detecting the short circuit, receive a current level signal based on electrical current on the system line and a voltage level signal based on a voltage on the system line;
   determine whether one or more detection thresholds are satisfied based on at least one of the current level signal and the voltage level signal;
   control the isolation switch to open or to remain open to isolate the first side from the second side when the one or more detection thresholds are not satisfied; and
   control the isolation switch to close or to remain closed to un-isolate the first side from the second side when all of the one or more detection thresholds are satisfied.

2. The isolation circuit of claim 1, further comprising a current monitor coupled between the system line and the controller and configured to sense the electrical current on the system line and to generate the current level signal based on the electrical current.

3. The isolation circuit of claim 2, further comprising a comparator coupled between the current monitor and the controller and configured to receive the current level signal from the current monitor and to provide a current alert signal to the controller when the current level signal does not satisfy a current threshold.

4. The isolation circuit of claim 3, wherein the controller is further configured to transition from a sleep mode to an awake mode or remain in the awake mode on receipt of the current alert signal provided from the comparator when the current level signal does not satisfy the current threshold.

5. The isolation circuit of claim 3, wherein the controller is further configured to determine which of the first side and the second side of the isolation circuit is closest to the short circuit based on the current alert signal provided from the comparator.

6. The isolation circuit of claim 1, further comprising a timer that, in response to at least one of the voltage level signal being received, is initialized for a predetermined wait period and enabled to time out, said time out defining expiration of the predetermined wait period.

7. The isolation circuit of claim 6, wherein the controller is further configured to:
   upon expiration of the predetermined wait period, read a second current level signal based on electrical current level on the system line and a second voltage level signal based on a voltage level on the system line; and
   determine, based on the second current level signal and the second voltage level signal, whether the one or more detection thresholds are satisfied.

8. The isolation circuit of claim 1, further comprising a voltage monitor coupled between the system line and the controller, the voltage monitor configured to sense the voltage on the system line and to generate the voltage level signal based on the sensed voltage.

9. The isolation circuit of claim 8, wherein the voltage monitor comprises:
   a first voltage monitor to sense a first voltage level at the first side of the system line; and
   a second voltage monitor to sense a second voltage level at the second side of the system line;
   wherein the controller is further configured to determine whether the one or more detection thresholds are satisfied further based on one or more of the sensed first voltage level and the sensed second voltage level.

10. The isolation circuit of claim 1, wherein the network is part of a fire detection system.

11. The isolation circuit of claim 10, wherein the isolation circuit is embedded in any of: an initiating device, a notification appliance, a fire panel, an annunciator, a fire network repeater, and independent isolator device.

12. The isolation circuit of claim 1, wherein the isolation switch is a solid-state switch.

13. The isolation circuit of claim 12, wherein the isolation switch is a transistor.

14. A method of isolating, within an isolator, a first port from a second port, the method comprising the steps of:
- detecting a condition indicative of a short circuit on a network;
- adjusting a predetermined duration period based on a number of registered False Positive events;
- waiting the adjusted predetermined duration period;
- if, after the predetermined duration period expires, the condition is no longer present, registering a False Positive event; and
- if, after the predetermined duration period expires, the condition is still present, isolating the first port from the second port;
- wherein,
  - the first port is in electrical communication with a first portion of the network, and
  - the second port is in electrical communication with a second portion of the network; and wherein,
  - in normal operation the first port is in electrical communication with the second port.

15. The method of claim 14 wherein the isolator is integrated into a device having a non-isolating function.

16. The method of claim 14 wherein the isolator is a standalone device.

17. The method of claim 14, further comprising the step of resetting the number of registered False Positive events if, after the predetermined duration period expires, the condition is still present.

18. The method of claim 14, further comprising, after isolating the first port from the second port, determining whether the condition is present, and if the condition is not present:
- waiting a predetermined delay,
- after the predetermined delay has expired, determining whether the condition is present, and if the condition is not present, reinstating electrical communication between the first port and the second port.

19. The method of claim 18 further comprising, prior to waiting, the step of adjusting the predetermined delay based on a number of registered repetitive short events.

20. The method of claim 19 further comprising, at predetermined intervals, reducing the number of registered repetitive short events.

21. The method of claim 18, further comprising, upon reinstating electrical communication between the first port and the second port, registering a repetitive short event.

22. The method of claim 14, further comprising, at predetermined intervals, reducing the number of registered false positive events.

23. A method of isolating, a first system line segment from a second system line segment, the method comprising the steps of:
- detecting a short circuit on a system line;
- waiting a predetermined waiting period; and
- after expiration of the predetermined waiting period, upon again detecting a short circuit on the system line, electrically isolating the segments from each other, and upon detecting absence of the short circuit, decreasing the predetermined waiting period by a predetermined amount.

24. A method of isolating, a first system line segment from a second system line segment, the method comprising the steps of:
- detecting a short circuit on a system line;
- in response to detecting the short circuit, electrically isolating the segments from each other;
- after a predetermined delay, detecting if the short circuit is no longer present;
- in response to detecting that the short circuit is no longer present, electrically reconnecting the segments to each other;
- counting a number of short circuits that have occurred within a predetermined period; and
- adjusting the predetermined delay based on the number of short circuits.

* * * * *